INVENTORS:
WILLIS D. DILLON
EVAN W. PITTENGER
BY: *Robert J. Scharp*
ATTORNEY

United States Patent Office 3,559,475
Patented Feb. 2, 1971

3,559,475
APPARATUS AND METHOD FOR MEASURING THE TACK OF MATERIALS
Willis D. Dillon, Ballwin, and Evan W. Pittenger, St. Louis, Mo., assignors to Monsanto Company, St. Louis, Mo., a corporation of Delaware
Filed Oct. 17, 1969, Ser. No. 867,207
Int. Cl. G01n 19/04
U.S. Cl. 73—150                                                6 Claims

ABSTRACT OF THE DISCLOSURE

A tackiness tester which comprises a support roller and a sensing roller disposed above the support roller. A plate having the material for which it is desired to measure the adhesive properties is passed between the support roller and the sensing roller. The adhesive forces existing between the sensing roller and the plate cause a frictional drag to movement of the plate. The plate is urged between the rollers by means of a movable housing which carries a linear variable differential transformer. The transformer, core, and plate are connected through a pair of spring plates on the housing so that movement of the plate between the rollers creates a reaction to the frictional drag and causes a shifting of the transformer core with respect to the housing and transformer coil to generate an output current proportional to the adhesive properties.

---

In recent years there has become a widespread need for efficient and reliable measurement of the physical parameters of materials. This is particularly true of the measurement of the tackiness of material. In the area of film forming materials used as protective coatings, top coatings, or the like, it is often desirable to measure the degree of tackiness of this coating. In the formulation of these materials, the manufacturer often needs to know the amount of tackiness developed in certain batches in order to control the processing of the material.

There are a number of devices presently available which are capable of measuring the tack of material, such as that illustrated in U.S. Pat. No. 3,369,176 or that illustrated in U.S. Pat. No. 3,368,399. However, these devices are not designed to give accurate and uniform measurements which are needed by the parties desiring to conduct a monitoring of the tackiness parameter of materials being processed.

It is, therefore, the primary object of the present invention to provide an apparatus which is capable of measuring the pressure-sensitive adhesive parameters of the material by use of the measurement of force vectors.

It is another object of the present invention to provide an apparatus of the type stated which is capable of measuring pressure-sensitive adhesive parameters with a high degree of accuracy.

It is a further object of the present invention to provide an apparatus of the type stated which is highly efficient in its operation, durable in its construction, and capable of being used in a wide variety of measuring functions.

It is an additional object of the present invention to provide a method of measuring the pressure sensitive tack of materials by generating voltages in response to frictional forces produced by the tack of the material being measured.

With the above and other objects in view, our invention resides in the novel features of form, construction, arrangement and combination of parts presently described and pointed out in the claims.

Figure 1:
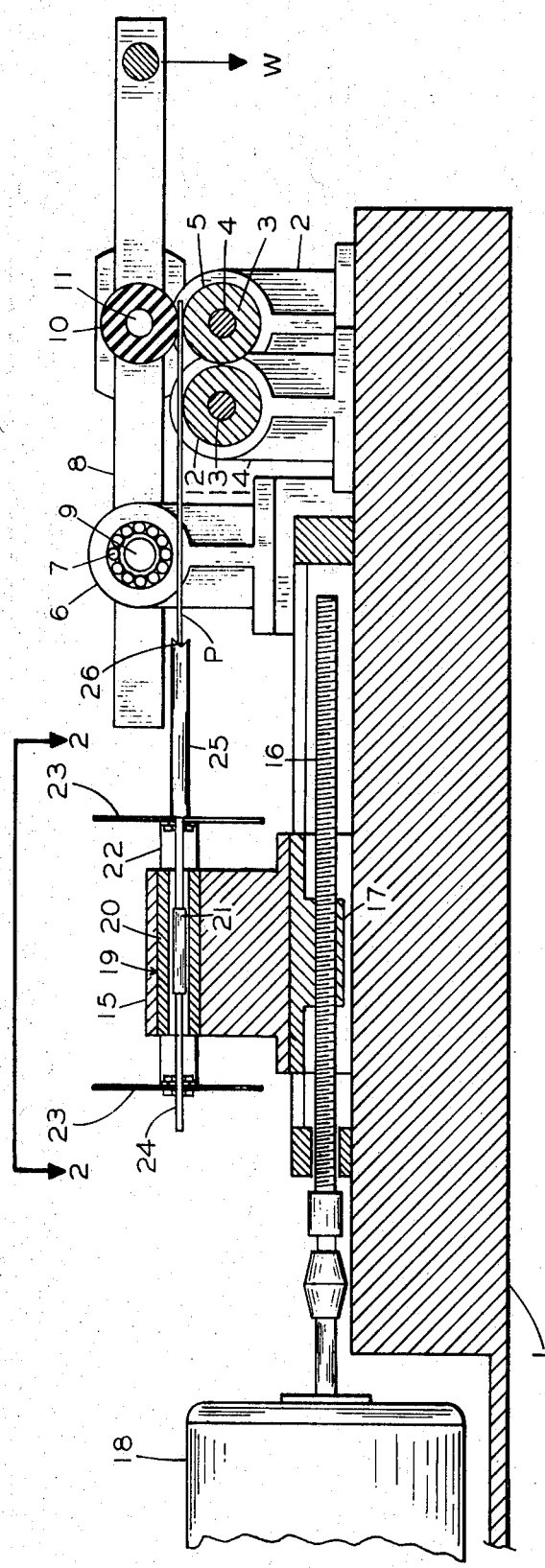
Figure 2:
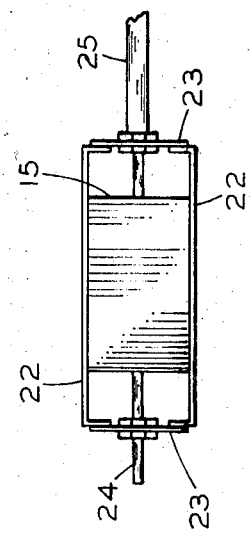

In the accompanying drawings:

FIG. 1 is a schematic side elevational view of an apparatus for measuring the tack of materials which is constructed in accordance with and embodying the present invention; and FIG. 2 is a horizontal fragmentary sectional view taken along line 2—2 of FIG. 1.

Referring now in more detail and by reference characters to the drawings which illustrate the preferred embodiment of the present invention, A designates a tackiness tester generally comprising a base plate 1. Mounted along one transverse end of the base plate 1 are a pair of transversely spaced upstanding bosses 2 and extending between journals 3 mounted in the bosses 2 is a transversely extending support shaft 4 which carries a support roller 5. Also mounted on the base plate 1 is another upstanding boss 6 having a bearing 7 for rotatably supporting an outwardly extending beam 8, the latter being mounted on a stub shaft 9. By reference to FIG. 1, it can be seen that the beam 8, which is a cantilever type of beam carries a sensing roller 10 by means of a shaft 11. A weight W can also be mounted on the free end of the beam 8 in the manner as illustrated in FIG. 1.

A second support roller 12 can also be mounted in longitudinally spaced relation to the support roller 5 and is supported by means of a transversely extending shaft 13, the latter being mounted in upstanding brackets 14, secured to the base plate 1.

The sample being tested is conveniently disposed on a sample plate P, which is urged between the support roller 5 and the sensing roller 10 in the manner as illustrated in FIG. 1. The sample plate P may be a flat plate, or it may take the forms such as a rod of circular cross section, etc. It can be seen that the support plate P, which may be urged to the right reference being made to FIG. 1, will create a reverse frictional effect or drag from the sensing roller 10, thereby creating a force vector to the right. In this particular case, the support roller 5 and the sensing roller 10 should preferably have an elastomeric peripheral surface which contacts the flat planar surfaces of the plate P. Any of a known number of elastomeric materials such as some of the urethanes may be used as the peripheral surface.

Also mounted on the base plate 1 is an outer housing 15 in the form of an upstanding block which is movable by means of a jack screw 16 having a follower 17 thereon. The follower 17 is, in turn, operatively connected to the housing 15 in the manner as illustrated in FIG. 1. The jack screw 16 is operable by means of a conventional A.C. or D.C. variable speed electric motor 18.

At its upper end, the housing 15 is longitudinally bored to accommodate a linear variable differential transformer 19 which includes a transformer coil 20 and an armature 21 which is concentrally disposed within the coil 20. Secured to the forwardly and rearwardly presented surfaces of the housing 15 are a pair of opposed longitudinally extending U-shaped brackets 22 and extending between and secured to the ends of the brackets 22 are a pair of leaf-type springs or so-called "spring plates" 23. The armature 21 which is concentrically disposed within the core 20 is mounted on a horizontally extending shaft 24 which is, in turn, secured to the two spring plates 23, in the manner as illustrated in FIGS. 1 and 2. The right-end spring plate 23 is also rigidly connected to a longitudinally extending driving armature 25 and half a beveled edge 26 for engagement with the plate P.

Thus, it can be seen that as the jack screw 16 is rotated through the action of the motor 18 the housing 15 will be driven to the right, reference being made to FIG. 1. As this occurs, the driving arm 25 will engage the plate P and urge the same to the right between the annular peripheral surfaces of the roller 5, 10. If a relatively tacky material was coated on the upper surface of the plate P, a frictional drag will be created by means of the sensing roller 10. As this occurs, there will be a force vector to the left tending to impede the motion of the housing. This force vector will be transmitted through the driving arm 25. Inasmuch as the driving arm 25 is connected to the armature 21 through the leaf springs 23, the armature 21 will be driven to the left with respect to the coil 20. As a result of this displacement of the armature 21, a voltage will be induced in the coil 20 and transmitted through a conductor (not shown) to a suitable readout device (not shown). Accordingly, it can be seen that a direct readout device connected to the coil 20 is thus capable of measuring the impedance force created by the sensing roller 10, which is proportional to the tackiness of the material on the surface of the plate P.

The frictional drag imposed upon the plate P results from adhesive forces existing between the plate P and the sensing roller 10. As the plate P is urged between the support roller 5 and the sensing roller 10, the plate P has a tendency to temporarily adhere to the sensing roller 10. The plate P will also experience a tendency to follow the annular surface of the sensing roller 10 as it rotates in the counterclockwise direction. However, the plate P, being a rigid member, follows a horizontal path between the rollers 5, 10 and the force necessary to brake the adhesive bond between the plate P and the roller 10 gives rise to the frictional drag.

It should be observed that the weight W is selected with respect to the material on the plate P to be tested and with regard to the overall dynamics of the system. It can be seen that there would be some tendency for the plate P to be curved in somewhat of an arc about the roller 10. The support roller 12, which is disposed longitudinally with respect to the support roller 5, will overcome this tendency.

It should be understood that changes and modifications in the form, construction, arrangement and combination of parts presently described and pointed out may be made and substituted for those herein shown without departing from the nature and principle of our invention.

Having thus described our invention, what we desire to claim and secure by Letters Patent is:

1. A device for determining the adhesive properties of a material comprising base means, first roller means operatively mounted on said base means, second roller means disposed in opposed relation to said first roller means, a sample member capable of being passed between said first and second roller means, and in contact therewith, while carrying said material on one surface thereof, driving means for urging said sample member in a first direction between said roller means, said first and second roller means being located to create a force impeding the movement of said sample member proportional to the tackiness of said material, and converter means operatively associated with said first and second roller means for converting said impeding force to an electrical signal.

2. The device of claim 1 further characterized in that said first roller means is swingable with respect to said second roller means.

3. The device of claim 1 further characterized in that said converter means is a current transformer.

4. The device of claim 1 further characterized in that said driving means comprises a housing, spring-like means on said housing, a driving arm engageable with said sample member and said spring-like means, and transformer means operatively connected to said spring-like means.

5. A method of determining the adhesive properties of a material comprising disposing a portion of said material on a sample member, urging said sample member through a pair of rolling surfaces in a first direction, causing an impeding force to movement in the first direction which impeding force is proportional to the adhesive properties of the material and where the impeding force tends to cause movement in a second direction, and producing an electrical signal proportional to the size of said impeding force.

6. The method of claim 5 further characterized in that a biasing movement is applied to one of said rolling surfaces causing the same to move toward from the other of said rolling surfaces.

References Cited

UNITED STATES PATENTS

| | | | |
|---|---|---|---|
| 2,498,265 | 2/1950 | Green | 73—150 |
| 3,368,399 | 2/1968 | Wirz | 73—150 |

LOUIS R. PRINCE, Primary Examiner

W. A. HENRYS II, Assistant Examiner